United States Patent
Habibi

(10) Patent No.: US 10,543,785 B2
(45) Date of Patent: Jan. 28, 2020

(54) REARVIEW MIRROR ASSEMBLY WITH ROUNDED FRONT SUBSTRATE

(71) Applicant: MAGNA MIRRORS OF AMERICA, INC., Holland, MI (US)

(72) Inventor: Hamid Habibi, Holland, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 123 days.

(21) Appl. No.: 15/610,767

(22) Filed: Jun. 1, 2017

(65) Prior Publication Data

US 2017/0349102 A1 Dec. 7, 2017

Related U.S. Application Data

(60) Provisional application No. 62/345,297, filed on Jun. 3, 2016.

(51) Int. Cl.

| | |
|---|---|
| G02F 1/153 | (2006.01) |
| B60R 1/08 | (2006.01) |
| B60R 1/04 | (2006.01) |
| B60R 1/06 | (2006.01) |
| G02F 1/157 | (2006.01) |
| G02F 1/161 | (2006.01) |

(52) U.S. Cl.
CPC .............. *B60R 1/088* (2013.01); *B60R 1/04* (2013.01); *B60R 1/06* (2013.01); *G02F 1/157* (2013.01); *G02F 1/161* (2013.01); *G02F 2203/02* (2013.01)

(58) Field of Classification Search
CPC ....................................................... B60R 1/088
USPC ......................................................... 359/267
See application file for complete search history.

(56) References Cited

U.S. PATENT DOCUMENTS

| | | |
|---|---|---|
| 3,427,096 A | 2/1969 | Dykema et al. |
| 4,712,879 A | 12/1987 | Lynam et al. |
| 4,936,533 A | 6/1990 | Adams et al. |
| 5,066,112 A | 11/1991 | Lynam et al. |
| 5,073,012 A | 12/1991 | Lynam |
| 5,076,673 A | 12/1991 | Lynam et al. |
| 5,100,095 A | 3/1992 | Haan et al. |
| 5,115,346 A | 5/1992 | Lynam |
| 5,140,455 A | 8/1992 | Varaprasad et al. |

(Continued)

FOREIGN PATENT DOCUMENTS

WO 2017191558 A1 11/2017

*Primary Examiner* — James C. Jones
(74) *Attorney, Agent, or Firm* — Honigman LLP

(57) ABSTRACT

A rearview mirror assembly for a vehicle includes a mirror reflective element having a first glass substrate and a second glass substrate with an electro-optic medium sandwiched therebetween and bounded by a perimeter seal. The first glass substrate has a first surface and a second surface and the second glass substrate has a third surface and a fourth surface. The second surface has a transparent electrically conductive coating that opposes and contacts the electro-optic medium and the third surface has an electrically conductive coating that opposes and contacts the electro-optic medium. A front substrate has a rounded perimeter edge region that has a radius of curvature of at least 2.5 mm and that spans between a front side and a rear side of the front substrate. The rear side of the front substrate is adhesively attached at the first surface of the first glass substrate of the mirror reflective element.

12 Claims, 2 Drawing Sheets

(56) References Cited

U.S. PATENT DOCUMENTS

| | | |
|---|---|---|
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,820,097 A | 10/1998 | Spooner |
| 5,910,854 A | 6/1999 | Varaprasad et al. |
| 5,984,482 A | 11/1999 | Rumsey et al. |
| 6,002,511 A | 12/1999 | Varaprasad et al. |
| 6,154,306 A | 11/2000 | Varaprasad et al. |
| 6,178,034 B1 | 1/2001 | Allemand et al. |
| 6,318,870 B1 | 11/2001 | Spooner et al. |
| 6,329,925 B1 | 12/2001 | Skiver et al. |
| 6,449,082 B1 | 9/2002 | Agrawal et al. |
| 6,483,438 B2 | 11/2002 | DeLine et al. |
| 6,540,193 B1 | 4/2003 | DeLine |
| 6,593,565 B2 | 7/2003 | Heslin et al. |
| 6,690,268 B2 | 2/2004 | Schofield et al. |
| 6,877,709 B2 | 4/2005 | March et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,360,932 B2 | 4/2008 | Uken et al. |
| 7,626,749 B2 | 12/2009 | Baur et al. |
| 7,855,755 B2 | 12/2010 | Weller et al. |
| 8,049,640 B2 | 11/2011 | Uken et al. |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 2006/0061008 A1 | 3/2006 | Kamer et al. |
| 2012/0229882 A1* | 9/2012 | Fish, Jr. .............. B60R 1/025 359/267 |
| 2012/0236388 A1 | 9/2012 | De Wind et al. |
| 2013/0107563 A1 | 5/2013 | McCabe et al. |
| 2014/0022390 A1 | 1/2014 | Blank et al. |
| 2014/0293169 A1 | 10/2014 | Uken et al. |
| 2014/0313563 A1 | 10/2014 | Uken et al. |
| 2015/0097955 A1 | 4/2015 | De Wind et al. |

* cited by examiner

REARVIEW MIRROR ASSEMBLY WITH ROUNDED FRONT SUBSTRATE

CROSS REFERENCE TO RELATED APPLICATION

The present application claims the filing benefits of U.S. provisional application Ser. No. 62/345,297, filed Jun. 3, 2016, which is hereby incorporated herein by reference in its entirety.

FIELD OF THE INVENTION

The present invention relates generally to the field of rearview mirror assemblies for vehicles, such as interior and exterior rearview mirror assemblies.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

The present invention provides an interior rearview mirror assembly that comprises a reflective element assembly having a variable reflectance electro-optic (such as electrochromic) mirror reflective element and a separately formed front rounded substrate that is laminated at or adhered to the front surface of the mirror reflective element. The present invention provides enhanced processing for a rounded perimeter mirror reflective element assembly, since the grinding and polishing of the front rounded substrate is done separate from the front glass substrate of the electro-optic mirror reflective element. Thus, the process and mirror assembly of the present invention separates the grinding and polishing of the perimeter edge regions of the front rounded substrate from the processing of the front glass substrate and the construction of the mirror reflective element, and thus limits contamination of the rear surface of the front glass substrate, which is coated with a transparent conductive layer.

These and other objects, advantages, purposes and features of the present invention will become apparent upon review of the following specification in conjunction with the drawings.

DESCRIPTION OF THE PREFERRED EMBODIMENTS

Figure 1:
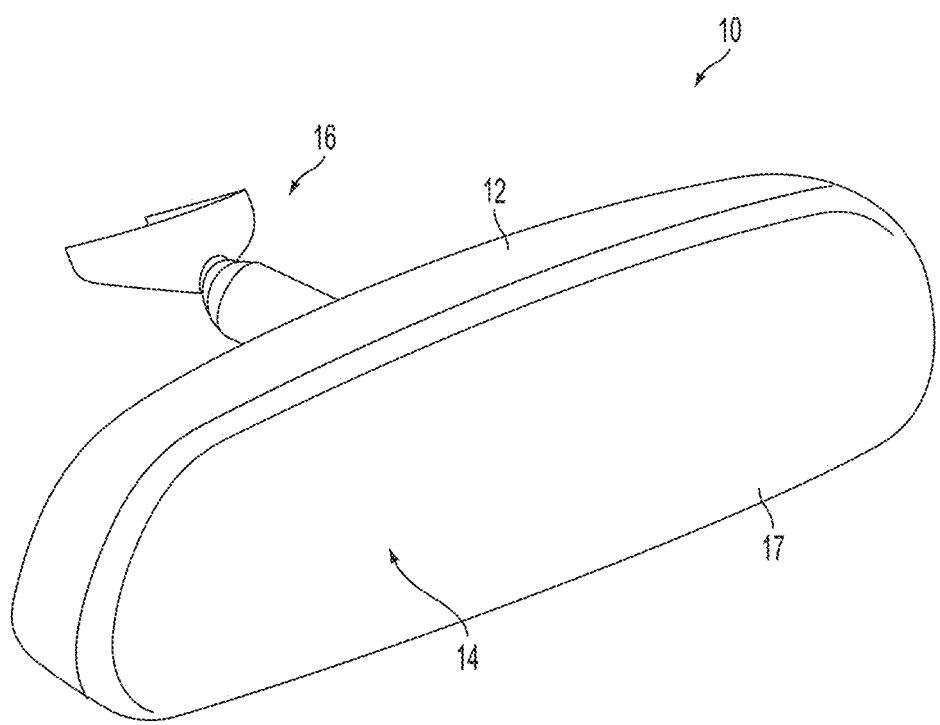
FIG. 1 is an exploded perspective view of an interior rearview mirror assembly having a mirror reflective element in accordance with the present invention.

Referring now to the drawings and the illustrative embodiments depicted therein, an interior rearview mirror assembly 10 for a vehicle includes a casing 12 and a reflective element assembly 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element assembly 14 comprises a variable reflectance mirror reflective element 15 that varies its reflectance responsive to electrical current applied to conductive coatings or layers of the reflective element. The mirror reflective element assembly 14 comprises a plastic or glass-like front cover element or substrate 17 that is adhered to the front surface of a front glass substrate of the mirror reflective element 15, as discussed below.

Figure 2:
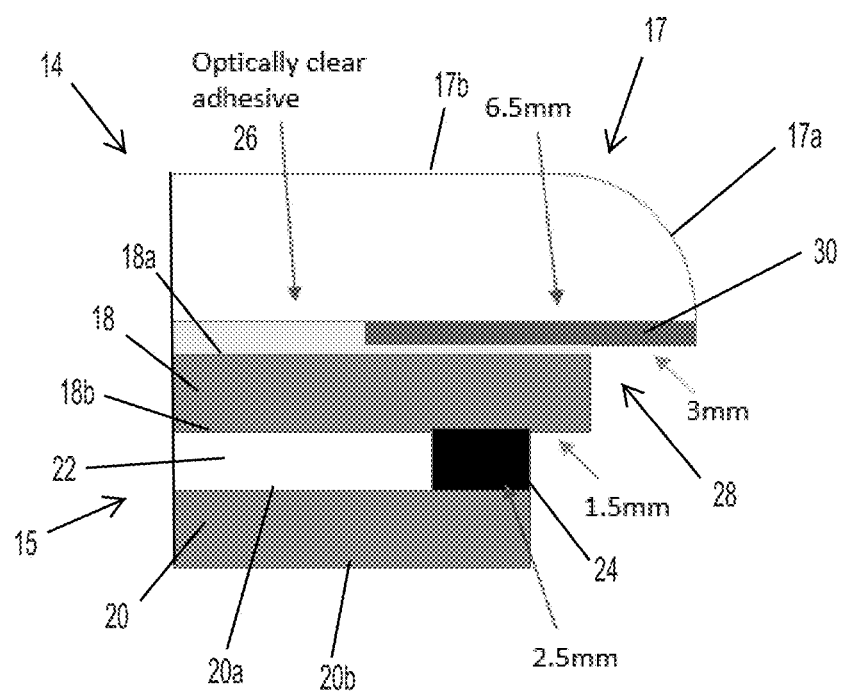
FIG. 2 is a sectional view of a portion of the mirror reflective element of the mirror assembly of the present invention.

In the illustrated embodiment, and as shown in FIG. 2, the mirror reflective element 15 comprises a laminate construction variable reflectance electro-optic (such as electrochromic) reflective element assembly having a front glass substrate 18 and a rear glass substrate 20 with an electro-optic medium 22 (such as electrochromic medium) sandwiched therebetween and bounded by a perimeter seal 24. As shown in FIG. 2, front glass substrate 18 has a front or first surface 18a (the surface that generally faces the driver of a vehicle when the mirror assembly is normally mounted at the vehicle) and a rear or second surface 18b opposite the front surface 18a, and rear glass substrate 20 has a front or third surface 20a and a rear or fourth surface 20b opposite the third surface 20a, with the electro-optic medium 22 disposed between the second surface 18b and the third surface 20a and bounded by the perimeter seal 24 of the reflective element (such as is known in the electrochromic mirror art). The second surface 18a of front glass substrate 18 has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20a has a metallic reflector coating (or multiple layers or coatings) established thereat. The third surface 20a of rear glass substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface 20*a* defines the active EC area or surface of the rear substrate within the perimeter seal 24. The coated third surface 20*a* may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

As shown in FIG. 2, the front rounded substrate or cover 17 is attached or adhered or bonded at the first surface 18*a* of front glass substrate 18 of the mirror reflective element 15. For example, the front rounded substrate 17 may be bonded to the first surface 18*a* via an optically clear adhesive 26 or the like. The front rounded substrate 17 comprises a glass substrate that ground and polished to provide a rounded perimeter edge region 17*a* (or the front rounded substrate may comprise plastic or acrylic substrate that is formed with the rounded perimeter region) to provide an exposed rounded outer perimeter edge region of the reflective element assembly.

As shown in FIG. 2, the front rounded substrate 17 has a larger cross dimension than the front glass substrate 18 of the mirror reflective element 15, such that there is an overhang region 28 along the periphery of the front cover and outboard of the periphery of the front glass substrate 18. Thus, when the reflective element assembly 14 is mounted at the mirror casing 12, the front and rear substrates of the reflective element 15 are nested in the mirror casing and the overhang region 24 of the front rounded substrate 17 abuts the periphery of the mirror casing 12, whereby the curved exposed perimeter edge region of the front rounded substrate 17 provides a smooth continuous transition from a front surface 17*b* of the front rounded substrate 17 and the side walls or side wall surfaces of the mirror casing 12 (such as in a similar manner as the front glass substrates provide for the mirror assemblies described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

Thus, the present invention provides a rounded exterior perimeter of a mirror reflective element assembly without having to grind and polish the front glass substrate of the EC reflective element or cell. The present invention allows for using a standard offset electrochromic mirror reflective element (such as electrochromic mirror reflective element 15) and then laminating the reflective element to a front piece or substrate or cover (such as front rounded substrate 17) that has the ground/polished edge and optionally a perimeter hiding layer or band 30. If there is a slight band shift/shadow, such a shadow can be limited or minimized by using a thinner ITO front substrate. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties.

The present invention allows for a reduction of the many steps in grinding and polishing a front glass substrate (and such long processes can embed defects that only show up at the end of line when too much value has been added to the mirror assembly). With the process and front substrate or cover of the present invention, a substantially simpler standard offset interior mirror reflective element assembly is made and the front substrate or cover can be inspected and accepted before laminating it to a front glass substrate of an electrochromic mirror reflective element that has also been inspected and accepted (where the front glass substrate has already been joined with a rear glass substrate and filled with an electrochromic medium to form the electrochromic reflective element).

With the process of the present invention, the standard offset EC mirror reflective element or cell is fabricated and tested to be free of any defects (PODs, DI, distortion, etc.). The mirror reflective element or cell may be made with a thinner front substrate and may be made without a perimeter band or hiding layer to hide the perimeter seal. The ground/polished rounded front substrate is also made and inspected to be free of defects. The two parts (the rounded front substrate and the fully assembled and tested and inspected EC mirror reflective element or cell) are then laminated or attached or bonded together using an optically clear adhesive (OCA).

The front ground/polished piece may comprise a glass substrate that is ground and polished to provide a water-clear rounded perimeter edge region or may comprise a molded plastic element (or optionally, the rounded perimeter edge region may be frosted or otherwise treated or finished to provide a desired appearance about the periphery of the mirror reflective element assembly). A perimeter band coating or hiding layer may be disposed at the perimeter edge region of the rear surface of the front rounded substrate such that, when the front rounded substrate is laminated to the EC mirror reflective element, the hiding layer or band coating conceals the perimeter seal of the EC mirror reflective element. Optionally, the front or rear surface of the front glass substrate of the EC mirror reflective element may include a hiding layer or band coating that conceals the perimeter seal from view through the front rounded substrate. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, which are all hereby incorporated herein by reference in their entireties. Optionally, if the front substrate 17 includes a perimeter band 30 (as discussed above), the mirror reflective element may not include a perimeter band, which allows for a lower cost, easier to manufacture, mirror reflective element or cell.

The process of the present invention allows the mirror reflective element to be made with thinner glass combinations, such as about 1.6 mm for both the front glass substrate and the rear glass substrate, or such as about 1.6 mm for either the front or rear glass substrate and about 1.1 mm for the other of the front or rear glass substrate, or such as about 1.1 mm for both the front glass substrate and the rear glass substrate. Thus, the present invention allows for a thinner laminate mirror reflective element since the thickness of the front rounded substrate, when adhered at the front surface of the thin front glass substrate (e.g., 1.1 mm thick or less), can provide the desired rigidity and strength for the mirror reflective element.

The electrical connection to the transparent conductive coating at the second surface of the first glass substrate of the EC mirror reflective element may comprise a conductive epoxy disposed at the overhang region (instead of an ITO clip or the like), while the electrical connection to the third surface conductive coating may comprise a third surface clip or any other suitable electrical connection means. A wrap-around coating and fourth surface bus-bars may be eliminated with the configuration of the mirror reflective element assembly of the present invention.

Figure 3:
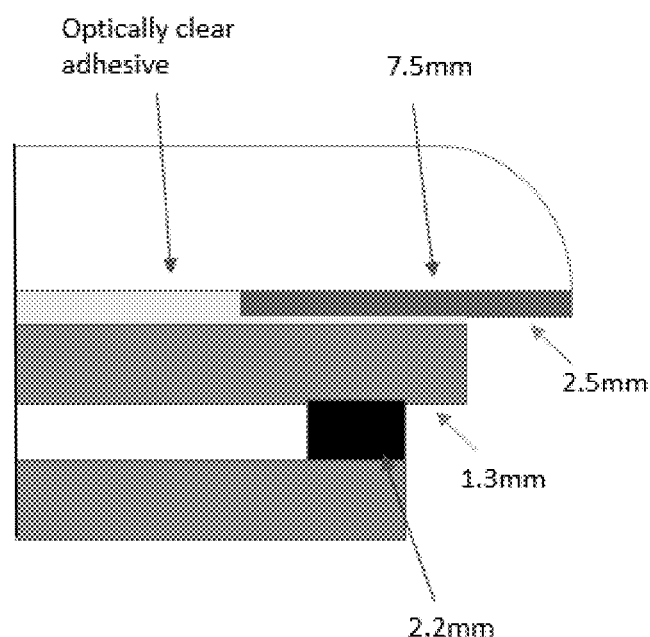
FIG. 3 is a sectional view of a portion of the mirror reflective element of the mirror assembly of the present invention.

For mirror reflective elements having a front glass substrate that is ground and polished to provide the rounded perimeter edge region (such as described in U.S. Pat. Nos. 8,730,553 and/or 8,508,831, which are hereby incorporated herein by reference in their entireties), there are difficulties in protecting the ITO surface of the front glass substrate of the mirror reflective element during the grind/polish process. With the process of the present invention, the ground/polished rounded front substrate does not have ITO (or other suitable transparent conductive coating) on its rear surface and it does not have to be clean to the level of cleanliness expected for a POD free substrate for the EC cell or reflective element. And there is no need for any laser ablation of the perimeter band coating or layer. FIGS. 2 and 3 show different proposed dimensions for the mirror reflective element assembly of the present invention.

Therefore, the present invention provides a mirror reflective element assembly that includes an electro-optic (such as electrochromic) mirror reflective element and a front rounded substrate laminated to or adhered to the front or first surface of the reflective element. The front rounded substrate is ground and polished to provide a rounded perimeter edge region and can be made separate from the construction and testing of the mirror reflective element. Thus, the present invention provides enhanced processing and reduced waste of reflective elements, since the grinding and polishing steps are made to a separate substrate that is separate and distinct from the reflective element construction (comprising a front glass substrate and rear glass substrate with an electrochromic medium sandwiched therebetween and bounded by a perimeter seal).

The fully assembled mirror reflective element assembly of the present invention (having a completed and tested electrochromic reflective element laminated at the rear of a completed and checked front rounded substrate) may be attached at a back plate and disposed at a mirror casing, whereby the rounded perimeter edge region of the front rounded substrate provides a smooth continuous transition from the front surface of the front rounded substrate to an outer side wall surface of the mirror casing. Optionally, the mirror reflective element assembly of the present invention may include a rear cover-like substrate, such as by utilizing aspects of the mirror assemblies described in PCT Application No. PCT/IB2017/052542, which is hereby incorporated herein by reference in its entirety.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831 and/or 8,730,553, and/or U.S. Publication Nos. US-2014-0022390; US-2014-0293169 and/or US-2015-0097955, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

The back plate may comprise any suitable construction. Optionally, for example, a common or universal back plate, whereby the appropriate or selected socket element or pivot element (such as a socket element or such as a ball element or the like) is attached to the back plate to provide the desired pivot joint for the particular mirror head in which the back plate is incorporated. Optionally, when molding the back plate, a different insert may be provided to integrally mold a portion of or all of a ball member or the like (such as a portion of a base of a ball member, whereby the ball member may comprise a metallic ball member that is insert molded at the base and at the rear of the back plate during the injection molding process that forms the back plate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A rearview mirror assembly for a vehicle, said rearview mirror assembly comprising:
  a mirror reflective element comprising a first glass substrate and a second glass substrate with an electro-optic medium sandwiched therebetween and bounded by a perimeter seal, wherein said first glass substrate has a first surface and a second surface and wherein said second glass substrate has a third surface and a fourth surface, and wherein said second surface has a transparent electrically conductive coating that opposes and contacts said electro-optic medium and wherein said third surface has an electrically conductive coating that opposes and contacts said electro-optic medium;
  a front substrate having a front side and a rear side and a rounded perimeter edge region having a radius of curvature of at least 2.5 mm, wherein said rounded perimeter edge region spans between the front side and rear side along the perimeter of said front substrate;
  wherein said front substrate includes a reflective circumferential perimeter band established at said rear side of said front substrate and along a periphery of said rear side of said front substrate;
  wherein said rear side of said front substrate is adhesively attached at said first surface of said first glass substrate of said mirror reflective element; and
  wherein, when said rear side of said front substrate is adhesively attached at said first surface of said first glass substrate of said mirror reflective element, said reflective circumferential perimeter band conceals said perimeter seal of said mirror reflective element from view to a person viewing said front side of said front substrate.

2. The rearview mirror assembly of claim 1, wherein said rearview mirror assembly comprises an interior rearview mirror assembly configured to mount at an interior portion of a vehicle equipped with said rearview mirror assembly.

3. The rearview mirror assembly of claim 1, wherein said rearview mirror assembly comprises an exterior rearview mirror assembly configured to mount at an exterior portion of a vehicle equipped with said rearview mirror assembly.

4. The rearview mirror assembly of claim 1, wherein said front substrate comprises a glass front substrate.

5. The rearview mirror assembly of claim 1, wherein said front substrate is formed by grinding and polishing said rounded perimeter edge region.

6. The rearview mirror assembly of claim 1, wherein said front substrate is formed separate from said mirror reflective element and said mirror reflective element is formed before said rear side of said front substrate is adhesively attached at said first surface of said first glass substrate of said mirror reflective element.

7. The rearview mirror assembly of claim 1, wherein said front substrate has a cross dimension that is larger than a cross dimension of said first glass substrate of said mirror reflective element.

8. The rearview mirror assembly of claim 7, wherein said mirror reflective element is received in a mirror casing and said rounded perimeter edge region of said front substrate provides a smooth continuous transition between said front side of said front substrate and a side wall surface of said mirror casing.

9. A method of assembling a rearview mirror assembly for a vehicle, said method comprising:
  providing a mirror reflective element comprising a first glass substrate and a second glass substrate with an electro-optic medium sandwiched therebetween and bounded by a perimeter seal, wherein said first glass substrate has a first surface and a second surface and wherein said second glass substrate has a third surface and a fourth surface, and wherein said second surface has a transparent electrically conductive coating that opposes and contacts said electro-optic medium and wherein said third surface has an electrically conductive coating that opposes and contacts said electro-optic medium;

providing a front substrate having a front side and a rear side;

forming a rounded perimeter edge region along the perimeter of said front substrate, wherein said rounded perimeter edge region spans between the front side and rear side and has a radius of curvature of at least 2.5 mm, wherein said rounded perimeter edge region is formed along the perimeter of said front substrate when said front substrate is separate from said mirror reflective element;

establishing a reflective circumferential perimeter band at said rear side of said front substrate and along a periphery of said rear side of said front substrate;

after forming said rounded perimeter edge region along the perimeter of said front substrate and after establishing said reflective circumferential perimeter band at said rear side of said front substrate, adhesively attaching said rear side of said front substrate at said first surface of said first glass substrate of said mirror reflective element; and wherein, when said rear side of said front substrate is adhesively attached at said first surface of said first glass substrate of said mirror reflective element, said reflective circumferential perimeter band conceals said perimeter seal of said mirror reflective element from view to a person viewing said front side of said front substrate.

10. The method of claim 9, wherein said front substrate comprises a glass front substrate.

11. The method of claim 10, wherein forming a rounded perimeter edge region comprises grinding and polishing the periphery of said front substrate.

12. The method of claim 9, comprising providing a mirror casing and attaching said mirror reflective element assembly at said mirror casing such that said rounded perimeter edge region of said front substrate provides a smooth continuous transition between said front side of said front substrate and a side wall surface of said mirror casing.

* * * * *